United States Patent [19]

Knauss

[11] Patent Number: 4,574,183
[45] Date of Patent: Mar. 4, 1986

[54] ELECTRICALLY HEATED DEEP FRYER

[75] Inventor: Hermann Knauss, Oberderdingen, Fed. Rep. of Germany

[73] Assignee: E.G.O. Elektro-Gerate Blanc u. Fischer, Fed. Rep. of Germany

[21] Appl. No.: 640,564

[22] Filed: Aug. 14, 1984

[30] Foreign Application Priority Data

Aug. 18, 1983 [DE] Fed. Rep. of Germany ....... 3329793

[51] Int. Cl.⁴ .............................................. F27D 11/00
[52] U.S. Cl. ....................................... 219/438; 99/411; 99/403; 99/450; 126/391; 219/430; 219/439; 219/441
[58] Field of Search ............... 219/298, 312, 415, 430, 219/432, 433, 434, 436, 438, 439, 441, 442, 521; 99/336, 403, 407, 410, 411, 413, 450; 126/387, 391

[56] References Cited

U.S. PATENT DOCUMENTS

| | | | |
|---|---|---|---|
| 1,907,265 | 5/1933 | Schwedersky | 99/408 |
| 2,360,727 | 10/1944 | Kettle | 99/450 |
| 2,528,776 | 11/1950 | Pappas | 99/411 |
| 3,194,662 | 7/1965 | Nelson | 99/403 X |
| 3,217,633 | 11/1965 | Anetsberger | 99/327 |
| 3,690,246 | 9/1972 | Guthrie, Sr. | 99/410 X |
| 3,714,889 | 2/1973 | Mazzola et al. | 99/411 |
| 3,878,360 | 4/1975 | Augustine et al. | 219/312 |
| 3,971,307 | 7/1976 | Graham | 99/403 |

FOREIGN PATENT DOCUMENTS

| | | |
|---|---|---|
| 594078 | 3/1934 | Fed. Rep. of Germany . |
| 1746637 | 3/1957 | Fed. Rep. of Germany . |
| 1154604 | 9/1963 | Fed. Rep. of Germany . |
| 1978694 | 2/1968 | Fed. Rep. of Germany . |
| 935297 | 6/1948 | France . |
| 2167558 | 8/1973 | France . |
| 2167557 | 8/1973 | France . |
| 2244436 | 4/1975 | France . |
| 608182 | 12/1978 | Switzerland . |
| 489921 | 8/1938 | United Kingdom . |
| 668613 | 3/1952 | United Kingdom . |
| 807354 | 1/1959 | United Kingdom . |
| 1282252 | 7/1972 | United Kingdom . |

Primary Examiner—Volodymyr Y. Mayewsky
Attorney, Agent, or Firm—Steele, Gould & Fried

[57] ABSTRACT

The main container of a deep fat fryer has electrical tubular heaters outside the frying fat area and integrated in thermally conductive manner into the walls of a flow circulating shaft and which heat the frying fat in the case of upwardly directed flows through flow channels and consequently keep it in continuous flow circuit by means of a rising flow channel. For temperature regulation purposes is provided a fat temperature sensor which directly taps the fat temperature and also a temperature sensor in the form of a running dry protection means, which taps the temperature directly on the tubular heaters or the associated wall.

17 Claims, 16 Drawing Figures

ELECTRICALLY HEATED DEEP FRYER

BACKGROUND OF THE INVENTION

The invention relates to an electrically heated deep fat fryer with a frying fat area bounded by walls and in particular having a removable insert and which is arranged in a main container, which in the upper zone forms a frying area and which is provided with an electrical tubular heater or the like for heating the fat, whilst below the frying area is preferably provided a draining area which is smaller compared with its horizontal cross-section.

A domestic deep fat fryer of this type is known, (German Utility Model 1 978 694), in which the electrical tubular heater is located in concentrically curved circular portions above the draining area in the frying fat area, namely in the bottom region of the frying area. This arrangement has the important disadvantage that the frying fat is locally overheated, particularly in the contact area with the tubular heater and consequently its physiological effects as a food are significantly detiorated and may in fact be made harmful to the health.

SUMMARY OF THE INVENTION

The object of the invention is to provide a deep fat fryer of the aforementioned type, in which the frying fat is very carefully heated and can be very rapidly brought to the required frying temperature and can be kept at the desired frying temperature.

This object is achieved by a fryer with a circulation well having walls defining grooves, and tubular heating elements disposed in the grooves on an outer wall surface. An insert wall is positioned with respect to the outer wall to form rising and falling flow channels. As a result, the tubular heater does not come into direct contact with the frying fat and as a result of the flow imparted to the frying fat by the flow circulating shaft, the fact can rapidly absorb the thermal energy in a very uniform manner throughout the volume of the fat. This leads to a significantly reduced stress of the fat and consequently to a much increased service life of the frying fat. Preferably all the tubular heaters are arranged in the above-described manner.

A particularly advantageous further development results from inserting at least one tubular heater in an open hollow depression shaped out of the wall. The wall profilings lead to a very high strength, even in the case of greatly reduced wall thickness, which further improves the heat transfer. If compensating strips are provided, they can be formed in simple manner by sheet metal strips made from structural steel or the like and with respect to the main container wall appropriately have a larger contact surface than with respect to the tubular heater. As a result of the wall profiling, the contact surface between the tubular heater and the wall can be significantly increased.

In order to obtain favourable flow conditions with optimum frying fat quantity, the further development providing tubular heaters in directly-adjacent, superimposed manner over almost the entire height of the shaft in the form of a wall corrugation. This leads to large horizontal cross-sections of the frying area compared with the small horizontal cross-sections of the shaft.

A very simple construction of the object of the invention results from fixing at least one tubular heater to the wall with an interposed thermally conductive compensating strip. It has been found that linear, rod-shaped tubular heaters have a much longer service life than curved tubular heaters and are almost indestructible. Such tubular heaters can also be easily electrically interconnected, e.g. in series and connected to a power cable.

A further development is appropriately provided for accurately controlling the temperature of the frying fat. This temperature sensor has a large surface, so that it very rapidly responds and the fat temperature can be regulated within very narrow limits.

A particularly advantageous construction, which can also be used in means other than the presently described deep fat fryer cpomprises a rod-like tubular temperature sensor of a thermal cutout is provided as a protection against the fat being used up or running dry immediately adjacent to at least one tubular heater and/or the associated wall and in thermally conductive connection therewith. If the temperature sensor, which taps the temperature on the frying fat is not in direct contact with the latter due to the fact that the fat surface level has dropped too low, the fryer is effectively protected against overheating by the running dry protection means. The reason for this is that the associated temperature sensor taps the temperature on the tubular heater. Very simple fitting results from the heat conducting element with a large contact surface.

The arrangement of the invention ensures a very vigorous flow behaviour of the frying fat, which is precisely defined in its flow path. The frying fat is heated in the rising flow channels and consequently the flow rate thereof is increased. The rising, heated frying fat then comes into the frying area in the wall region, where it is most cooled by wall contact. By means of the common channel walls, the rising frying fat can also be heated in a first phase.

By virtue of imprived flow and heating characteristics, there is a rapid and reliable deposition of solid particles in the draining area, an easy cleaning of the flow shaft and flow channels and an accurately defined position of the frying basket with respect to the upper ends of the flow channels. However, it is also possible to achieve simple cleaning and simple construction of the deep fat fryer, whilst avoiding difficultly accessible dirt angles.

If the deep fat fryer is to be operated with a fat volume smaller than its area volume, this can be very simply achieved with the construction according to the invention. As a result the fryer can be simply adapted to a particular requirements, e.g. the amount of frying required per unit of time.

It has been found that the deep fat fryer according to the invention, which is particularly suitable as a high capacity fryer for commercial use, has a relatively low energy requirement of 0.5 to 0.7 kW/liter of frying fat, but nevertheless ensures a very rapid raising of the fat temperature again after cooling has taken place. The heat transfered per unit surface can also be considerably increased over usual specific thermal surface loading rates, i.e. by approximately 1.5 to 2 times.

The features of preferred further developments can be gathered from the following description, in conjunction with the drawings. THe features described there and in the subclaims can be realized singly or in the form of subcombinations in any embodiment of the invention.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
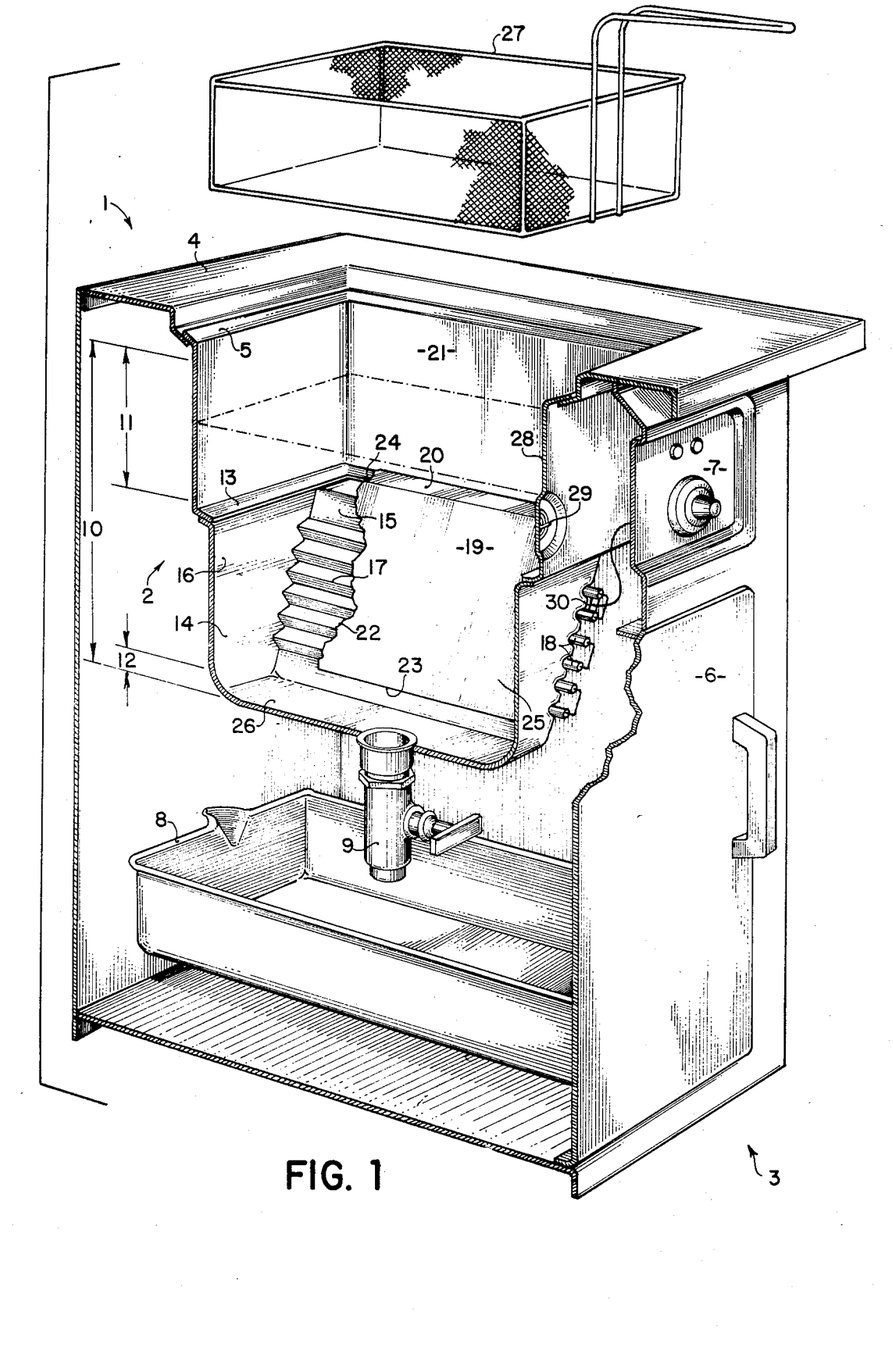
FIG. 1 is a deep fat fryer according to the invention in a part sectional, perspective view.

The deep fat fryer 1 shown in FIG. 1 has an in plan view substantially elongated rectangular main container 2 made from stainless steel sheeting, whose upper, outwardly bent edge 5 is suspended in a recessed cutout of the horizontal cover plate 4 of a cabinet 3 made from a similar or different material. On the front narrow side, cabinet 3 has a door 6 and above the latter an instrument panel 7 for pilot lights, switches, etc. On the bottom of the cabinet there is a collecting trough 8, above which is provided a vertical drain connection 9 inserted in the bottom of main container 2 and which is provided with a manually operable closing valve.

Main container 2 essentially comprises two superimposed parts, whereof the upper part forms the upper, vertical walls, extending up to edge 5, of the further part of the main container 2, whilst the lower, cup-shaped part is fixed by its bottom surface to a lower, inwardly projecting shoulder edge of the upper part and carries the drain connection 9 in its base. It is also conceivable to form the complete main container or one of the parts from two half-shells, whose connection plane is formed by a vertical plane, particularly a plane of symmetry. The main container can also comprise welded together, substantially flat sheet metal plates and in this case the weld seams are formed on the inside of the container, particularly in the vicinity of the reentrant angles as fillet welds, so that there are also smooth inner faces in the vicinity of said angles.

At roughly half the height of the upper, further portion of the main container 2 in FIG. 1, indicated in broken line form, the surface level of the frying fat, when the deep fat fryer is not filled with food to be fried. On introducing the maximum amount of food to be fried, the frying fat level can almost extend up to edge 5, i.e. the frying fat area 10 extends from said maximum height of the frying fat level to the bottom of main container 2. Frying area 11 extends downwards from the same height to just above an inwardly projecting stepped bottom 13 which runs round the outer walls and offsets the frying area 11 with respect to a flow circulation shaft 14 located directly below it and which is formed by the lower container part and connecting on to the stepped bottom 13 is smaller over its entire width in its horizontal cross-sections than the frying area 11. The two opposite longitudinal walls 15 of shaft 14, which are at right angles to the front of the fryer, are outwardly inclined under the same acute angles, whilst the two walls 16 at right angles thereto are vertical. Over their entire length at a height of more than half the wall height, walls 15 are provided with bead-like, corrugated profilings, which directly pass into one another. Corrugations 17 form on the outside of the particular wall 15, cross-sectionally prismatic slots or inner and outer surfaces of wall 15. The slots receive in each case one rod-like, linear tubular heater 18 passing over the entire length of the wall. The tubular heaters 18 are applied in metallic connection to the outer surface of the particular wall 15, e.g. by welding or soldering and preferably using a special soldering process, e.g. with a nickel-phosphor solder, which provides thermally undetachable joints and which is also called a "pickup". In the case of a wall spacing of several centimeters, adjacent to the inner face of each wall 15 is provided a sheet metal, removable insert 19, which has an upper bent edge strip 20 which is at a limited distance above the associated porrtion of stepped bottom 13 and is approximately parallel thereto. Bent edge strip 20 is at a distance from the facing vertical wall 21 of the frying area 11. Insert 19, whose lateral edges tightly connect to walls 16, ends at a distance above the bottom of main container 2, but below the lowermost tubular heater 18. Insert 19 defines a rising flow channel 22 passing along the corrugation 17 and whose lower end 23 is at a limited distance above the bottom of main container 2 and whose upper bent end 25 defined by the stepped bottom 13 and the edge strip 20 is directed against the adjacent wall 21. The middle space between the two rising flow channels 22 forms a falling flow channel 25 for the frying fat, which consequently flows downwards between the inserts 19 out of the frying area 11, passes over the bottom of main container 2 whilst being divided up to either side into flow channels 22, flows upwards again therein accompanied by heating and acceleration and consequently is effectively circulated permanently in at least two closed circuits extending from the flat surface level to the bottom of main container 2. The space below the lower ends 23 of flow channels 22 forms a so-called "cold drain", i.e. a draining area 12 limited by the bottom 26 of main container 2 and where the fat temperature is well below the temperature of the main container and in which can collect residues, which drop through the screen or sieve of a frying basket 27 for receiving the food and which is placed in the frying area 11. Frying basket 27 stands on the edge strip 20, so that the heated frying fat passing out in the vicinity thereof flows directly into the frying basket 27.

Immediately above the stepped bottom 13, a fat temperature sensor 29 is arranged on the wall 28 of frying area 11 adjacent to the front, being inserted in large area engaging form into a flat circular depression on the outside of wall 28 and which is e.g., situated in a distance of about 2 to 3 mm from its basic sheet or wall to allow fat to flow along its whole circumference. Temperature sensor 29 is used for the manually variable setting of the electric power supply of tubular heater 18. A linear temperature sensor 30 is provided between two tubular heaters 18 and in corresponding metallic connection therewith and/or with the intermediate portion of wall 15. Said sensor acts as a running dry protection means and responds directly to the temperature of the tubular heaters 18, so that fire risks are also avoided when the fat level is below temperature sensor 29. As a result of the above-described temperature measurement an excellent, rapidly acting temperature limitation setting is possible, which covers both the influence of the liquid temperature and the heating influence.

Figures 5, 6:
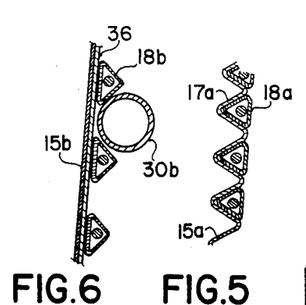
FIGS. 5 and 6 are two further embodiments for arrangements of tubular heaters in cross-section.
Figure 7:
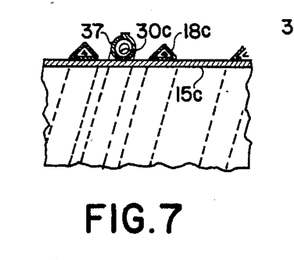
FIG. 7 is the arrangement of tubular heaters and temperature sensors on a tube.
Figure 8:
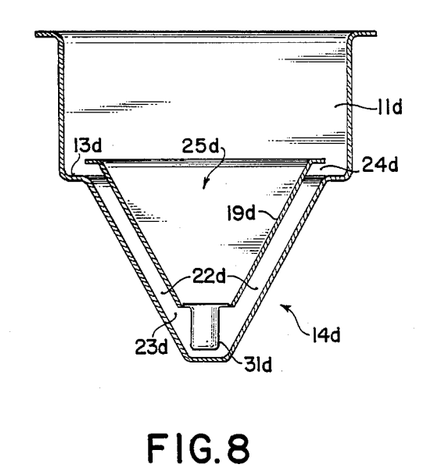
FIG. 8 is another embodiment of a deep fat fryer in a view according to FIG. 2.
Figure 9:
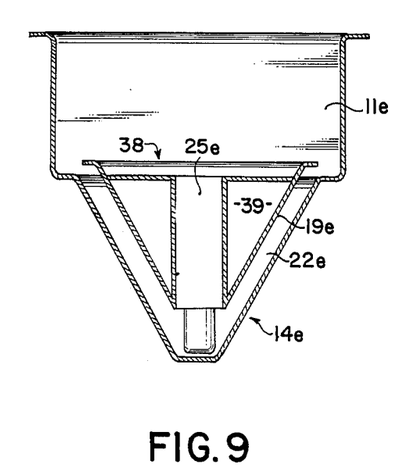
FIG. 9 is the deep fat fryer according to FIG. 8 in the converted state.
Figure 10:
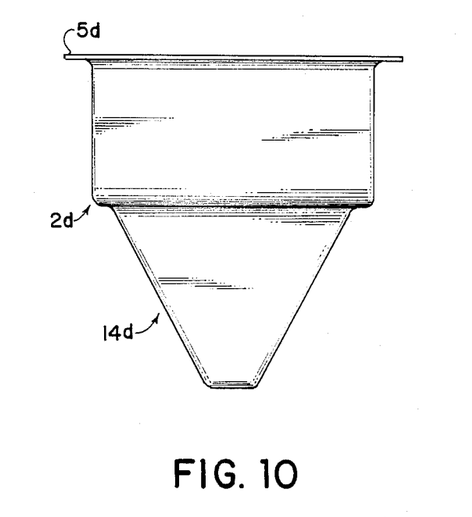
FIG. 10 is a view of the deep fat fryer according to FIGS. 8 and 9.
Figure 11:
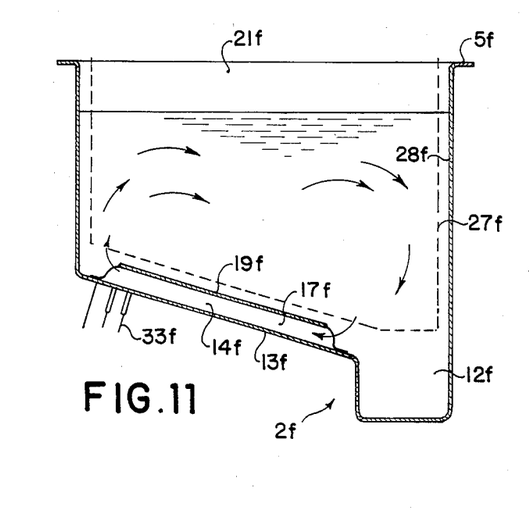
FIGS. 11 and 12 are diagrammatic vertical sections through further embodiments of deep fat fryers.
Figure 12:
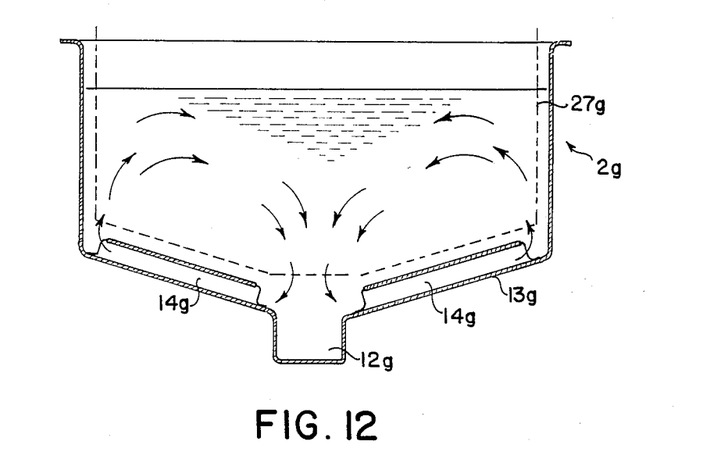
Figure 13:
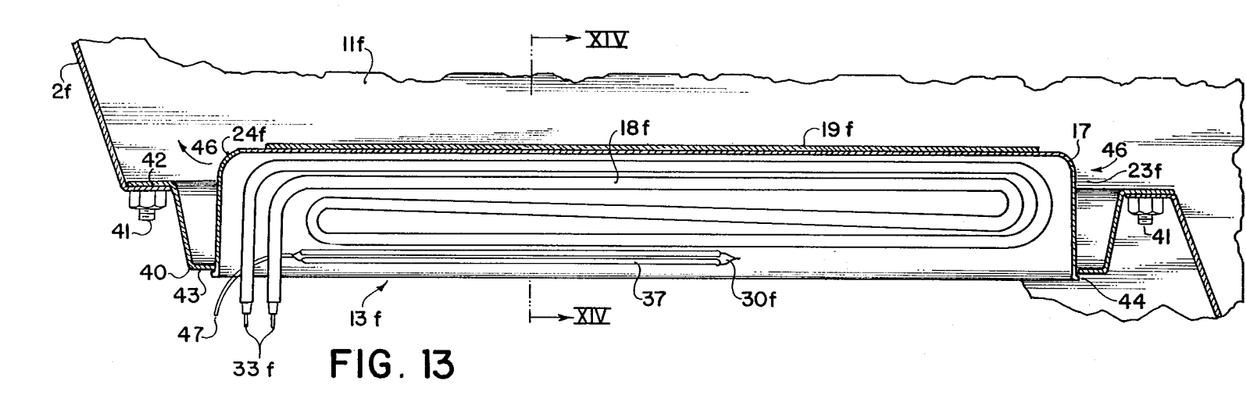
FIG. 13 is a larger-scale detail of the heating meanns of FIGS. 11 and 12.
Figure 14:
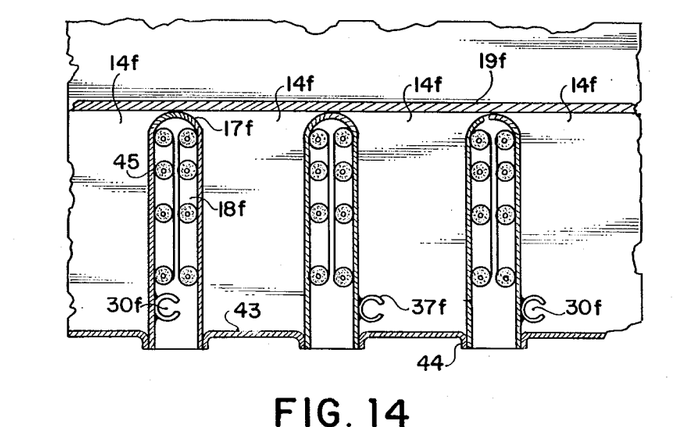
FIG. 14 is a larger-scale detail along line XIV—XIV of FIG. 13.
Figure 15:
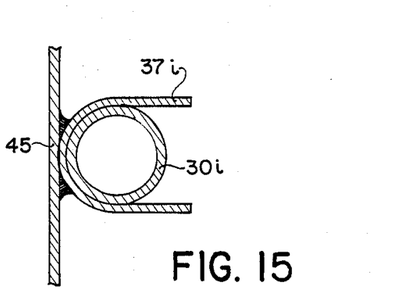
FIGS. 15 and 16 are details of a temperature sensor fastening on a larger scale.
Figure 16:
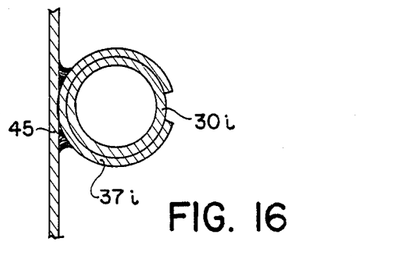

FIGS. 2 to 16 use the same reference numerals for the corresponding parts to those used in FIG. 1, but followed in FIGS. 2 to 5 by "a", in FIG. 6 by "b", in FIG. 7 by "c", in FIG. 8 by "d", in FIG. 9 by "e", in FIGS. 11, 13 and 14 by "f", in FIG. 12 by "g", and in FIGS. 15 and 16 by "i".

The deep fat fryer shown without cabinet and cover plate in FIGS. 2 to 5 has on its longitudinal side a significantly wider stepped bottom 13a, in such a way that shaft 14a has a width of approximately two fifths of the entire width of the frying area 11a. Both inserts 19a are combined by cross-braces to a dimensionally stable structure, which at its lower end carries a wire strainer 31, which is positioned immediately above the bottom 26a. The latter slopes down on all sides towards the drain connection 9a. The structure having inserts 19a is connected at the upper end to transverse support clips 32, which rest on the shoulder bases 13a with end portions curved in ski-like manner and to which are fixed the upper edge strips 20a, so that structure or insert 19 projects in suspended manner into shaft 14a. The temperature sensor 29a formed by the spirally curved tube is in this embodiment arranged in a circular depression on the inside of rear wall 20a of frying area 11a, so that the liquid to be measured directly flows around it. The connection ends 33 of tubular heaters 18a are all located on one narrow side, e.g. the front side of main container 2a, so that they can be connected to a common connecting block 34. In the vicinity of tubular heaters 18a, the lowermost of which is at a distance above the draining area 12a, the outsides of the walls 15a are provided with e.g. sheet metal covers 35, which protect the tubular heaters 18a, insulate them against thermal radiation and ensure smooth outer faces in the vicinity of the shaft. The covers 13 can be constructed in a removable manner. It is also conceivable to fit additional tubular heaters on the narrow sides at right angles to the longitudinal walls, as well as on the latter, i.e. on the outsides of the associated walls of shaft 14a, which leads to a further increase in the heating capacity of the heat transfer surface. These additional tubular heaters can be fitted in a similar manner to those already described to the said wall.

Figures 2, 3:
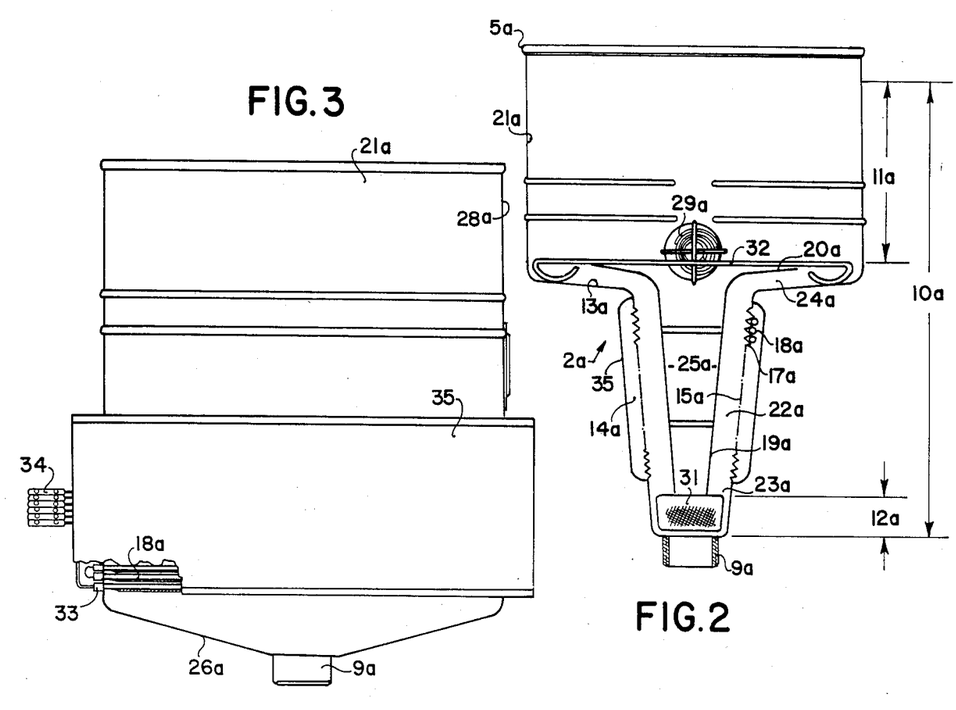
FIG. 2 is another embodiment of a deep fat fryer in vertical cross-section.
FIG. 3 is the deep fat fryer according to FIG. 2 in side view.
Figure 4:
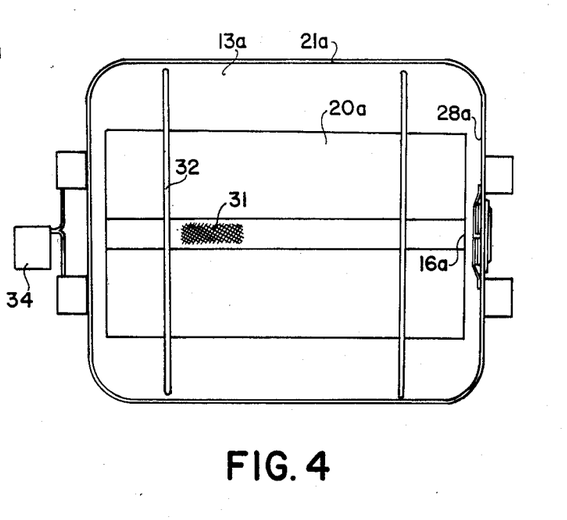
FIG. 4 is the deep fat fryer of FIG. 3 in plan view.

In place of circular cross-sections, as shown in FIG. 2, the tubular heaters 18a according to FIg. 5 can also have cross-sections diverging therefrom in order to increase the contact surface with wall 18a. In the represented embodiment, the tubular heaters 18a are cross-sectionally approximately equal-sided, triangular with rounded angle zones, in such a way that on two triangular sides they engage in substantially whole-area manner on the corrugation legs of the particular corrugations 17a. In cross-section, the corrugations 17a are formed in the manner of a uniform wave profile.

As shown in FIG. 6, the cross-sectionally e.g. rectangular, equal-sided, triangular tubular heaters 18a can be indirectly integrated in thermally conductive manner with wall 15b and in this case between the outer face of wall 15b and the heat transfer surface of tubular heater 15b are provided compensation strips 36 from a material which has better heat-conducting characteristics than wall 15b, e.g. structural steel. The compensating strips 36, whose thickness is roughly the same as that of wall 15b, but can also exceed the latter, have a larger width than the contact surface of tubular heater 18b engaging thereon, so that in the represented embodiment adjusting strips 36 directly abut with one another or pass into one another in one piece at their longitudinal edges. In this embodiment, temperature sensor 30b is in direct thermally-conductive contact and/or metallic connection along two surface lines with two adjacent tubular heaters 18b and along a further surface line is in corresponding connection with the wall 15b or the associated compensation strip 36, which ensures that a rapidly acting measurement can take place.

A construction corresponding to FIG. 6 is also possible where the tubular heater 18c is e.g. arranged in helical manner on the outer circumference of a tube wall 15c. In this embodiment, the temperature sensor 30c arranged helically on the outer circumference of wall 15c between two coils of tubular heater 18c is only in direct thermally conductive connection with wall 15c. To this end, a sheet metal heat conducting element 37 is fitted in metallic connection to the outer face of wall 15c, its cross-section being adapted to that of the temperature sensor 30c and after insertion of the latter in corresponding folds is closed in tightly engaging manner around the circumference of temperature sensor 30c.

In the embodiment according to FIG. 8, the inserts 19d are combined into a removable structure and in cross-section, flow channels 22d are at an angle of approximately 60° from one another.

According to FIG. 9, said structure is formed by a displacer 38, which through tight hollow chambers 39 has a much larger displacement volume than flow channel 25e and in the same fryer can e.g. be interchanged with the structure of FIG. 8, so that it is then possible to work with a smaller amount of frying fat. The hollow chambers 39 are located between flwo channel 25e and flow channels 22e.

The main container 2f of the deep fat fryer of FIG. 11 has a base wall 13f, which slopes downwards at an acute angle to the horizontal which is continuous over most of its length and to whose lowest point is connected a draining area 12f linked with the associated vertical wall 18f which forms a channel, which is lower than the base wall 13f and extends over the entire width (at right angles to the drawing plane). Sheet metal parts 17f, 19f are fixed to base wall 13f in such a way that flow shafts 14f are formed in juxtaposed manner over the width of the frying area and are parallel to the inclination direction of base wall 13f. The inlet of the flow shafts 14 is above and on the edge of drainage area 12f and the outlet thereof is adjacent to the vertical wall connected to the highest point of the base wall 13f. The flow shafts 14f slope upwards from the draining area 12f under a relatively shallow angle, preferably between 20° and 30°, like base wall 13f. Whereas in FIG. 11 there is an asymmetrical construction with a draining area 12f arranged on one side and a base wall 13f sloping to one side, FIG. 12 shows a symmetrical construction of main container 2g, in which the draining area 12g is positioned centrally and base wall 13g slopes upwards therefrom to either side.

FIGS. 13 and 14 show the heating system in detail. Over virtually its entire surface, base wall 13f is formed by an insert carrier 40, which comprises a shell-like depressed sheet metal part, whose all-round flange edge is sealingly fitted to the wall of container 2f by means of spot-welded stay bolts 41 and interposed seal 42, but can also be welded in.

In the bottom 43 of insert carrier 40 are punched elongated hole-like, spout-like slots, provided with an outwardly placed-over edge 44, into which are welded elongated pockets 17f with the cross-sectional shape of an inverted, narrow and high U, the lower edges of the pockets 17f being connected to the lower edges of edges 44 by face or edge welding. The pockets extending over most of the length of insert carrier 40 and consequently base wall 13f project in rib-like manner into the interior of the container and form between them the flow shafts 14f, whose width is approximately twice and whose depth is approximately 3 to 4 times the thickness of pocket 17f.

Pockets 17f are formed from mirror-inverted-facing stainless steel sheeting half-shells 45 interconnected at a median longitudinal seam and on each half-shell is fitted a tubular heater 18f which is shaped like a folded back loop, which is therefore quadruple and whose connection ends 33f project from the U-shaped pockets 17f, which is open to the bottom and therefore towards the exterior of the container. The tubular heater 18f is fitted by means of a process similar to brazing and which is called "pickup". A nickel-phosphor solder is used, the metallic surface of the tubular heater and the material of the pocket forming a metallic connection such that they cannot be thermally separated from one another, the phosphor escaping during the soldering process ensuring that the solder initially has a lower melting point. This joint is extremely thermally stable and ensures optimum heat transfer. After applying the tubular heater to each of the half-shells, they are welded together in pairs in the manner described hereinbefore and subsequently welded into the insert carrier 40. However, it is also possible to form the parallel ribs or pockets 17f extending over almost the entire length of the insert by one of the half-shells in each case forming a pocket together with the corresponding portion of bottom 43 and one half-shell of th adjacent pocket forms a U-shaped component with an outwardly directed, rounded edge and tubular heaters fitted to the outside of the legs, the insert carrier 40 is then formed by welding together such parallel components along seam 29. It is also conceivable to provide the ribs or pockets in some other form and optionally to also provide the bottom 43 with tubular heaters fitted externally in thermally conductive connection. However, it is important that extensive wall portions of the flow shafts 14f are heated as uniformly as possible.

The top of the parallel flow shafts 14f is closed by a cover 19f in the form of a flat plate and this takes place over essentially the entire length thereof. At the start and finish of a flow shaft 14f and on the narrow front edges of pockets 17f, there are areas which are free from the cover and these form an inlet 23f and an outlet 24f. The cover 19f is fitted loosely and is secured in the represented manner to the pockets or container by not shown guides or fastenings, e.g. pins engaging in a hole in the cover.

Heating the liquid in flow shafts 14f gives rise to a buoyancy, which ensures a very rapid flow in the direction of arrows 46 and throughout the container, as can be gathered from the flow arrows of FIGS. 11 and 12. It is thereby advantageous for the flow to be downwardly directed in the region above the draining area 12f, follows by deflection to the side, because as a result any particles carried along can drop into the draining area 14 which is excluded from the oil circulation and due to the poor heat conduction of the liquids and the fact that there is no convection, is much cooler, namely by approximately 100° C., than the remainder of the container. The depressed arrangement of insert carrier 40 shown in FIG. 13 saves space in the container, because pockets 17f only project slightly above the height of the container flange. However, it is also possible to use a flush insert carrier, which permits an even better incident flow to inlet 23f and outlet 24f.

The setting and temperature regulation takes plave by means of so-called hydraulic regulators, i.e. temperature regulators with a system filled by expansion liquid, which contains a tubular temperature sensor 20f, which is connected by means of a capillary tube 47 to a not shown expansion receptacle, which acts on a quick-action switch. Temperature sensor 30f is arranged in parallel and relatively close to one of the tubular heater coils and is also in thermally conductive connection with the associated wall of half-shell 45. This can be brought about by the heat-conducting element 37i shown in FIGS. 15 and 16 which is shaped like a U-shaped sheet metal strip extending over virtually over the entire length of the temperature sensor and which in its central area is soldered or picked up from the inside to the wall of half-shell 45. Temperature sensor 30i (FIG. 15) is placed between the U-shaped legs of the heat-conducting element and then the legs are placed around the mostly tubular temperature sensor, so that it has a good heat-conducting connection to the wall. Due to the spacing of said arrangement from tubular heater 18f, it is possible to modify the magnitude of the heat influence from the heating system or the heated medium. Correspondingly, a temperature sensor can be fitted in a similar manner for setting purposes and as a dry running protection means, but at a different distance from the tubular heaters. For example, a temperature sensor used as a dry running protection means could be inserted in the gap between two tubular heaters.

What is claimed is:

1. An electrically heated deep fat fryer comprising: a main container having walls defining a frying fat area, said walls being made of material to be heated and the walls being adapted to hold frying fat, an upper zone of said main container forming a frying area for receiving a food-holding insert, said main container below the frying area and directly adjacent thereto forming a frying fat flow circulation well having a smaller width than the frying area, at least one wall of the main container on an outside of the well having groove-like depressions, electric tubular heating elements being inserted in the depressions over substantially an entire height of the well, the heating elements being attached to the wall in thermally conductive connection and inside the well an insert wall being positioned so as to form a rising flow channel with said wall and a falling flow channel on an opposite side of the insert wall, said insert wall forming a common wall of the rising and falling channels.

2. A deep fat fryer according to claim 1, wherein the groove-like depressions with the tubular heating elements are provided in directly adjacent, superimposed manner over substantially the entire height of the well in a form of a wall corrugation shaped out of the wall.

3. A deep fat fryer according to claim 1, wherein at least one tubular heating element is fixed to the wall by at least one thermally conductive compensating strip interposed between the heating element and the wall.

4. A deep fat fryer according to claim 1, wherein the wall having the tubular heating elements slopes outwards at an acute angle with respect to vertical to form an upwardly widened well, the wall passing into a stepped bottom of a frying area and being formed by a longitudinal wall of the well extending at least approximately over an entire length of the frying fat area.

5. A deep fat fryer according to claim 1, wherein a plurality of substantially rod-like, linear parallel tubular heating elements of substantially equal length, is arranged approximately horizontally between a draining area and the frying area, with ends being disposed adjacent for electrical connection.

6. A deep fat fryer according to claim 1, further comprising a fat temperature sensor arranged in the frying area, adjacent to the upper end of the well and an end wall of the frying area.

7. A deep fat fryer according to claim 6, wherein the temperature sensor is inserted in a form of a spirally curved sensor tube, the tube being filled with an expansion fluid, disposed in a depression at one side of its associated wall.

8. A deep fat fryer according to claim 1, further comprising a rod-like temperature sensor of a thermal cutout, directly adjacent to at least one tubular heating element, the rod-like temperature sensor and the heating element being thermally-conductively connected to one another, the rod-like temperature sensor forming part of a protection means against running dry.

9. A deep fat fryer according to claim 8, wherein the temperature sensor is arranged approximately parallel to and between two adjacent tubular heating elements.

10. A deep fat fryer according to claim 1, further comprising a rod-like temperature sensor connected to a thermal cutout, the rod-like temperature sensor being provided immediately adjacent to a wall integrated with said tubular heating element, the rod-like temperature sensor being thermally conductively connected to the heating elements and operative to activate a running dry protection means.

11. A deep fat fryer according to claim 10, wherein the temperature sensor is enclosed by a heat conducting element over substantially all of its circumference, said element being a U-shaped sheet metal profile metallically connected by a transverse web thereof to the wall and having U-legs which extend around the temperature sensor, the temperature sensor being enclosed by the heat conducting element over substantially its entire length.

12. A deep fat fryer according to claim 1, wherein the well is subdivided into two rising and one falling flow channels, and wherein the falling flow channel is located between the rising flow channels, the rising and falling flow channels having channel walls in common.

13. A deep fat fryer according to claim 1, comprising two rising flow channels and one falling flow channel, each rising flow channel having an upper end opening toward a bottom of the frying area and positioned at an angle with respect to a lower portion of the rising flow channel, said upper end being directed against an adjacent wall of the frying area.

14. A deep fat fryer according to claim 5, wherein a lower end of at least one flow channel in the well opens at a lower end of at least one further flow channel and the draining area.

15. A deep fat fryer according to claim 1, wherein an inner descending flow channel and two outer ascending flow channels are defined between the walls and the insert, the insert wall being removable, and forming inner boundary walls of the outer flow channels.

16. A deep fat fryer according to claim 1, wherein at least one flow channel forms a base surface for a frying basket removably inserted in the frying area and supports the frying basket.

17. A deep fat fryer according to claim 1, wherein the walls and the insert define two rising flow channels and one falling flow channel, the walls bounding the rising flow channels being arranged on a wall insert carrier, which is insertable in an associated container wall and wherein the depressions receiving the tubular heating elements are pockets formed from half-shells with in each case at least one tubular heating element on each half-shell.

* * * * *

UNITED STATES PATENT AND TRADEMARK OFFICE
CERTIFICATE OF CORRECTION

PATENT NO. : 4,574,183

DATED : March 4, 1986

INVENTOR(S) : Hermann Knauss

It is certified that error appears in the above-identified patent and that said Letters Patent is hereby corrected as shown below:

Column 1, line 39, delete "fact" and insert --fat--.

Column 2, line 14, delete "cpomprises" and insert --comprises--.

Column 2, line 38 delete "imprived" and insert --improved--.

Column 2, line 65, delete "THe" and insert --The--.

Column 3, line 25, delete "meanns" and insert --means--.

Column 5, line 59, delete "FIg." and insert --FIG.--.

Column 7, line 48, delete "th" and insert --the--.

Signed and Sealed this

Eleventh Day of August, 1987

*Attest:*

DONALD J. QUIGG

*Attesting Officer*  *Commissioner of Patents and Trademarks*